United States Patent
Tatsumi et al.

(10) Patent No.: US 9,403,215 B2
(45) Date of Patent: Aug. 2, 2016

(54) CUTTING TOOL AND METHOD FOR PRODUCING SAME

(75) Inventors: Natsuo Tatsumi, Itami (JP); Katsuko Yamamoto, Itami (JP); Hitoshi Sumiya, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 327 days.

(21) Appl. No.: 14/111,289

(22) PCT Filed: Apr. 10, 2012

(86) PCT No.: PCT/JP2012/059778
§ 371 (c)(1),
(2), (4) Date: Oct. 11, 2013

(87) PCT Pub. No.: WO2012/141171
PCT Pub. Date: Oct. 18, 2012

(65) Prior Publication Data
US 2014/0026492 A1    Jan. 30, 2014

(30) Foreign Application Priority Data

Apr. 11, 2011  (JP) ................................. 2011-087271
Apr. 11, 2011  (JP) ................................. 2011-087288

(51) Int. Cl.
*B23B 27/14*    (2006.01)
*B23B 27/20*    (2006.01)
(Continued)

(52) U.S. Cl.
CPC ............... *B23B 27/20* (2013.01); *B23B 27/141* (2013.01); *B82Y 30/00* (2013.01); *C04B 35/52* (2013.01);
(Continued)

(58) Field of Classification Search
CPC ..................... B23B 2226/125; B23B 2226/12; B23B 2226/31; B23B 2226/315; B23B 27/141; B23B 27/20; B23B 27/14; B23B 27/148; B23B 27/18; Y10T 407/26; Y10T 407/27; Y10T 408/81; Y10T 408/78; B23C 2226/12; B23C 2226/125; B23C 2226/31; B23C 2226/315
USPC .......................... 407/118, 119; 408/145, 144
See application file for complete search history.

(56) References Cited

U.S. PATENT DOCUMENTS

2004/0172885 A1*  9/2004  Middlemiss ............. B22F 7/06
                                                  51/293
2004/0221696 A1* 11/2004  Matsuhashi ............. B23B 27/06
                                                  82/1.11
(Continued)

FOREIGN PATENT DOCUMENTS

JP       1106102 U    7/1989
JP      11246271 A    9/1999
(Continued)

OTHER PUBLICATIONS

Machine Translation of WO 2008/088034, pp. 5-10; Jan. 27, 2016.*
(Continued)

*Primary Examiner* — Daniel Howell
*Assistant Examiner* — Nicole N Ramos
(74) *Attorney, Agent, or Firm* — Ditthavong & Steiner, P.C.

(57) ABSTRACT

The present invention provides a cutting tool that achieves cutting with high precision. The cutting tool of the present invention includes a cutting edge composed of a polycrystalline body including high-pressure-phase hard grains that contain one or more elements selected from the group consisting of boron, carbon, and nitrogen, the polycrystalline body being formed by subjecting a non-diamond carbon material and/or boron nitride, serving as a starting material, to direct conversion sintering under ultra-high pressure and high temperature without adding a sintering aid or a catalyst, in which letting the radius of curvature of the nose of the cutting edge of the cutting tool be R1, the sintered grains constituting the polycrystalline body have an average grain size of 1.2×R1 or less and a maximum grain size of 2×R1 or less.

14 Claims, 11 Drawing Sheets

(51) Int. Cl.
*C04B 35/52* (2006.01)
*C04B 35/5831* (2006.01)
*C04B 35/645* (2006.01)
*B82Y 30/00* (2011.01)

(52) U.S. Cl.
CPC ........... *C04B 35/5831* (2013.01); *C04B 35/645* (2013.01); *B23B 2226/125* (2013.01); *C04B 2235/421* (2013.01); *C04B 2235/425* (2013.01); *C04B 2235/427* (2013.01); *C04B 2235/5436* (2013.01); *C04B 2235/5445* (2013.01); *C04B 2235/6567* (2013.01); *C04B 2235/666* (2013.01); *C04B 2235/781* (2013.01); *C04B 2235/782* (2013.01); *C04B 2235/785* (2013.01); *C04B 2235/81* (2013.01); *C04B 2235/87* (2013.01); *Y10T 407/26* (2015.01); *Y10T 407/27* (2015.01)

(56) References Cited

U.S. PATENT DOCUMENTS

| | | | |
|---|---|---|---|
| 2009/0162152 A1* | 6/2009 | Omori | B23B 27/141 407/113 |
| 2010/0329804 A1* | 12/2010 | Okumura | B23B 27/141 408/1 R |

FOREIGN PATENT DOCUMENTS

| | | |
|---|---|---|
| JP | 11246271 B | 9/1999 |
| JP | 11335174 A | 12/1999 |
| JP | 200042807 A | 2/2000 |
| JP | EP 1006091 A1 * 6/2000 | .......... C04B 35/5831 |
| JP | 2001161701 A | 6/2001 |
| JP | 2001161701 B | 6/2001 |
| JP | 2003291036 A | 4/2003 |
| JP | 2003062707 A | 5/2003 |
| JP | 2003291036 A | 10/2003 |
| JP | 2003292397 A | 10/2003 |
| JP | 2003292397 B | 10/2003 |
| JP | 3553482 B2 | 5/2004 |
| JP | 2004148471 A | 5/2004 |
| JP | 2007022888 A | 2/2007 |
| JP | 2007030095 A | 2/2007 |
| JP | 4106574 B2 | 4/2008 |
| JP | 4110338 B2 | 4/2008 |
| JP | 2008229810 A | 10/2008 |
| JP | 4275896 B2 | 3/2009 |
| JP | 2009083052 A | 4/2009 |
| JP | 2009214213 A | 9/2009 |
| WO | 2008088034 A1 | 7/2008 |

OTHER PUBLICATIONS

Takashi Taniguchi, "Fine-grained cBN Sintered Body Obtained by Amorphous Boron Nitride", The Review of High Pressure Science and Technology, 2003, vol. 13, No. 1, pp. 16-23.
International Search Report for International Application No. PCT/JP2012/059778, date of mailing Jul. 17, 2012, 4 pages.
Kazuhiro Fujisaki et al., "Ultra-fine-grain binderless cBN cutting tool and processing technology", Machines and Tools, Mar. 2010, Partial Translation, 12 pages.
Hitoshi Sumiya et al., "Synthesis of High-purity Nano-Polycrystalline Diamond and Its Characterization", 2004, pp. 68-74.
Takashi Taniguchi, "Fine-grained cBN Sintered Body Obtained by Amorphous Boron Nitride", National Institute for Materials Sciences, 2003, vol. 13, No. 1, pp. 16-23.
Yoshiaki Agawa et al., "Deposition and application of ultrananocrystalline diamond (UNCD) with coaxial arc plasma gun", 2010, Monthly Tribology No. 272, 9 pages.

* cited by examiner

CUTTING TOOL AND METHOD FOR PRODUCING SAME

TECHNICAL FIELD

The present invention relates to a cutting tool used in cutting iron-based materials, dies for light-guide plates of liquid crystals, dies for Fresnel lenses, and so forth or to a cutting tool in directly cutting hard brittle materials, such as quartz, and optical components.

BACKGROUND ART

Hitherto, ultra-precision tools to machine dies for optical elements, such as diffraction gratings, have been composed of natural or artificial single-crystal diamond (PTLs 1 and 2). However, in the case of tools composed of single-crystal diamond, the material has a property of cleaving along the (111) plane. Thus, tools are chipped or broken by stress during use, which is a problem. The amount of wear varies depending on crystal orientation (uneven wear). Only a specific plane is worn away in a short time as tools are used, and prolonged machining cannot be performed, which is a problem. The reason for this is that, for example, the amount of wear at the (111) plane is significantly different from that at the (100) plane.

As countermeasures against the cleavage cracking and uneven wear, it is conceivable that sintered diamond may be used. Such sintered diamond is obtained by sintering diamond grains with a metal binder, such as cobalt, so the metal binder is present among the diamond grains. However, the metal binder portions are softer than the diamond grains and thus worn away in a short time. The diamond grains usually have a diameter of 0.5 to 25 µm, which is larger than a radius of curvature of a cutting edge of 0.1 µm or less that is required for ultra-precision machining. As a result, uneven wear occurs in the same way as the single crystal, thereby failing to form a fine pattern in a large area by machining.

As polycrystalline diamond free from a metal binder, there is polycrystalline diamond obtained by a chemical vapor deposition method (CVD method). However, the polycrystalline diamond usually has a grain size of 1 µm or more and low intergranular bonding strength. Thus, the life is disadvantageously short.

Ultrananocrystalline diamond (UNCD) containing smaller grains can be synthesized by, for example, a pulsed vacuum arc plasma deposition method (NPL 1). UNCD contains a large amount of hydrogenated amorphous carbon and thus has low wear resistance, compared with normal diamond.

As tools including cutting edges composed of materials other than diamond, cubic boron nitride (cBN) tools having hardness next to diamond are known.

There are some types of cBN tools. In the case where rough machining is performed inexpensively, a tool obtained by sintering cBN with a binder is disclosed in, for example, PTL 3. In the case where the binder is present, however, precise machining cannot be performed. Examples in which binder-free sintered cBN compacts are used are disclosed in PTL 4 and NPL 2. However, in these cases, the grain size of cBN was as large as 50 to 500 nm. Thus, it is difficult to perform ultra-precision machining using the binder-free cBN sintered bodies at a level required for optical components.

In recent years, progress has been made in sintering techniques. As disclosed in PTL 5, sintered cBN compacts having a grain size of less than 50 nm have been obtained. Attempts have been made to use them as tools. Here, an example is disclosed in which an R tool having a radius of curvature of 500 µm is produced by polishing and stainless steel is cut. However, this is a simple prototype of a tool of the order of micrometers. For example, no attempt has been made to form an ultrafine diamond grooving tool for nanoscale machining required to produce optical elements.

The inventors have attempted to produce a grooving tool and a V-shaped tool from similar fine-grain cBN. However, the fine-grain cBN had higher hardness than a normal cBN material; hence, microchipping occurred during polishing, failing to achieve sufficient accuracy as precision tools.

Such cutting tools composed of diamonds and cBN described above were machined and formed by polishing. Examples in which diamond tools are machined with a focused ion beam (FIB) in order to increase precision of ultra-precision cutting tools are disclosed in PTLs 6 and 7. However, from results of studies by the inventors, for example, in the case where a method described in PTL 6 was applied to a V-shaped tool, machining was performed by the irradiation of an ion beam only from the side of a rake face. Thus, a ridge between the rake face and a flank face was rounded to increase the radius of curvature. Therefore, the tool was not used for ultra-precision machining. PTL 7 discloses machining of either front portion or rear portion of a cutting edge. Similarly, for example, in the case where the technique is applied to a V-shaped tool, in the former, the radius of curvature of a ridge between a rake face and a flank face was increased in the same way as the method described in PTL 6. In the latter, the radius of curvature of a ridge between two flank faces was increased. In any case, the technique was not sufficient for ultra-precision machining.

PTL 8 discloses a method for producing a diamond tool, a cubic boron nitride tool, or the like by allowing a focused ion beam (FIB) to enter a flank face and then to emanate from a rake face. However, the results of studies by the inventors demonstrated that in this method, in particular, the radius of curvature of a ridge between two flank faces was increased and that the ridge was rapidly rounded as wear proceeds by cutting; hence, the method was not sufficient for ultra-precision machining over a longer distance.

CITATION LIST

Patent Literature

PTL 1: Japanese Unexamined Patent Application Publication No. 2004-148471
PTL 2: Japanese Unexamined Patent Application Publication No. 2008-229810
PTL 3: Japanese Patent No. 4110338
PTL 4: Japanese Patent No. 4106574
PTL 5: Japanese Unexamined Patent Application Publication No. 2009-214213
PTL 6: Japanese Unexamined Patent Application Publication No. 2007-030095
PTL 7: Japanese Patent No. 3553482
PTL 8: Japanese Unexamined Patent Application Publication No. 2009-083052

Non Patent Literature

NPL 1: Monthly Tribology No. 272 (2010), p. 64-65
NPL 2: The Review of High Pressure Science and Technology 13 (2003) 16

SUMMARY OF INVENTION

Technical Problem

To machine, for example, hard brittle materials, such as quartz, and dies as well as iron-based materials with a high level of precision required for optical components, current diamond is difficult to use, so a high-precision tool composed of boron nitride has been required. Furthermore, a tool having a sharp nose of a cutting edge of a tool, a sharp ridge between a rake face and a flank face, and a sharp ridge between two flank faces has been required to be efficiently produced.

The present invention has been accomplished in light of the foregoing circumstances. The present invention provides a tool that achieves high-precision cutting.

Solution to Problem

The inventors have found that in the case where a cutting tool for ultra-precision machining is composed of a polycrystalline body consisting substantially of a diamond polycrystalline body free from conventional single-crystal diamond or a metal binder, or consisting substantially of high-pressure-phase boron nitride, letting the radius of curvature of the nose of a cutting edge of the cutting tool be R1, letting the average grain size of high-pressure-phase hard grains of the cutting tool be $D_{50}$, and letting the maximum grain size be Dmax, when the radius of curvature R1, the average grain size $D_{50}$, and the maximum grain size Dmax of the polycrystalline body satisfy the following relationships, the cutting tool for ultra-precision machining provides stable cutting for prolonged periods of time:

$D_{50} \leq 1.2 \times R1$ $Dmax \leq 2.0 \times R1$

FIG. 10 illustrates the relationships among the radius of curvature R, the average grain size $D_{50}$, and the maximum grain size Dmax.

Furthermore, the inventors have accomplished the completion of the present invention as described below: A cutting edge of a cutting tool is a face formed with a focused ion beam. A flank face is divided into a flank face A and a flank face B, the flank face A being closer to a rake face, the flank face B being adjacent to the flank face A and farther from the rake face. After the flank face B is machined with a focused ion beam directed from the rake face side to the flank side, the flank face A is machined with a focused ion beam directed from the flank side to the rake face side.

That is, the present invention provides a cutting tool for ultra-precision machining as described below.

(1) A cutting tool includes a cutting edge composed of a polycrystalline body including high-pressure-phase hard grains that contain one or more elements selected from the group consisting of boron, carbon, and nitrogen, the polycrystalline body being formed by subjecting a non-diamond carbon material and/or boron nitride, serving as a starting material, to direct conversion sintering under ultra-high pressure and high temperature without adding a sintering aid or a catalyst, in which letting the radius of curvature of the nose of the cutting edge of the cutting tool be R1, the sintered grains constituting the polycrystalline body have an average grain size of 1.2×R1 or less and a maximum grain size of 2×R1 or less.

(2) In the cutting tool described in (1), letting the radius of curvature of a ridge between a rake face and a flank face of the cutting tool be R2, the sintered grains constituting the polycrystalline body have an average grain size of 1.2×R2 or less and a maximum grain size of 2×R2 or less.

(3) In the cutting tool described in (1) or (2), letting the radius of curvature of a ridge between two flank faces of the cutting tool be R3, the sintered grains constituting the polycrystalline body have an average grain size of 1.2×R3 or less and a maximum grain size of 2×R3 or less.

(4) In the cutting tool described in any one of (1) to (3), the radius of curvature R1 of the nose of the cutting edge of the cutting tool is 50 nm or less, and the sintered grains constituting the polycrystalline body have an average grain size of 60 nm or less and a maximum grain size of 100 nm or less.

(5) In the cutting tool described in any one of (2) to (4), the radius of curvature R2 of the ridge between the rake face and the flank face of the cutting tool is 50 nm or less, and the sintered grains constituting the polycrystalline body have an average grain size of 60 nm or less and a maximum grain size of 100 nm or less.

(6) In the cutting tool described in any one of (3) to (5), the radius of curvature R3 of the ridge between the two flank faces of the cutting tool is 50 nm or less, and the sintered grains constituting the polycrystalline body have an average grain size of 60 nm or less and a maximum grain size of 100 nm or less.

(7) In the cutting tool described in any one of (1) to (6), the cutting edge of the cutting tool is a face formed with a focused ion beam, and the flank face includes a flank face A and a flank face B, the flank face A being closer to the rake face, and the flank face B being adjacent to the flank face A and farther from the rake face.

(8) In the cutting tool described in (7), a length from a boundary between the flank face A and the rake face to a boundary between the flank face A and the flank face B is 3 μm or less.

(9) In the cutting tool described in (7) or (8), the cutting tool is obtained by machining the flank face B with a focused ion beam directed from the rake face side to the flank side and then machining the flank face A with a focused ion beam directed from the flank side to the rake face side.

(10) In the cutting tool described in any one of (1) to (9), the polycrystalline body has electrical conductivity.

(11) In the cutting tool described in any one of (1) to (10), letting the radius of curvature of the nose of the cutting tool be R1, letting the radius of curvature of a ridge between a rake face and a flank face be R2, and letting the radius of curvature of a ridge between two flank faces of the cutting tool be R3, the average grain size of the polycrystalline body satisfies 0.01×R1 or more, 0.01×R2 or more, and 0.01×R3 or more.

(12) In the cutting tool described in any one of (1) to (11), the polycrystalline body is composed of polycrystalline diamond consisting substantially of diamond alone, the polycrystalline diamond being formed by subjecting a non-diamond carbon material, serving as a starting material, to direct conversion sintering into diamond under ultra-high pressure and high temperature without adding a sintering aid or a catalyst.

(13) In the cutting tool described in any one of (1) to (11), the polycrystalline body is composed of polycrystalline boron nitride consisting substantially of high-pressure-phase boron nitride alone, the polycrystalline boron nitride being formed by subjecting low-pressure-phase boron nitride, serving as a starting material, to direct conversion sintering into high-pressure-phase boron nitride under ultra-high pressure and high temperature without adding a sintering aid or a catalyst, and wherein the high-pressure-phase boron nitride is cubic boron nitride and/or wurtzite boron nitride.

(14) In the diamond cutting tool described in any one of (1) to (13), the cutting tool is a V-shaped tool, a fly cutter, or a micro-grooving tool.

(15) A method for producing a cutting tool including a cutting edge composed of a polycrystalline body containing high-pressure-phase hard grains composed of one or more elements selected from the group consisting of boron, carbon, and nitrogen, the polycrystalline body being formed by subjecting a non-diamond carbon material and/or boron nitride, serving as a starting material, to direct conversion sintering under ultra-high pressure and high temperature without a sintering aid or a catalyst, includes:

a step of cutting the polycrystalline body with a laser into a tip shape;

a step of bonding the resulting polycrystalline tip to a shank;

a step of polishing the polycrystalline tip to form a rake face and a flank face; and a step of machining a rake face and a flank face with a focused ion beam.

(16) A method for producing a cutting tool including a cutting edge composed of a polycrystalline body containing high-pressure-phase hard grains composed of one or more elements selected from the group consisting of boron, carbon, and nitrogen, the polycrystalline body being formed by subjecting a non-diamond carbon material and/or boron nitride, serving as a starting material, to direct conversion sintering under ultra-high pressure and high temperature without a sintering aid or a catalyst, includes:

a step of cutting the polycrystalline body with a laser into a tip shape;

a step of bonding the resulting polycrystalline tip to a shank;

a step of polishing the polycrystalline tip to form a rake face and a flank face;

a step of forming a mask on the polycrystalline tip;

a step of forming the rake face and the flank face by dry etching; and a step of machining the rake face and the flank face with a focused ion beam.

Advantageous Effects of Invention

According to the cutting tool of the present invention for ultra-precision machining, it is possible to perform machining with high precision for a long period of time, compared with ultra-precision tools composed of single-crystal diamond and sintered cBN compacts and cutting tools composed of sintered diamond compacts and diamond obtained by vapor-phase synthesis in the related art.

DESCRIPTION OF EMBODIMENTS

Figure 1:
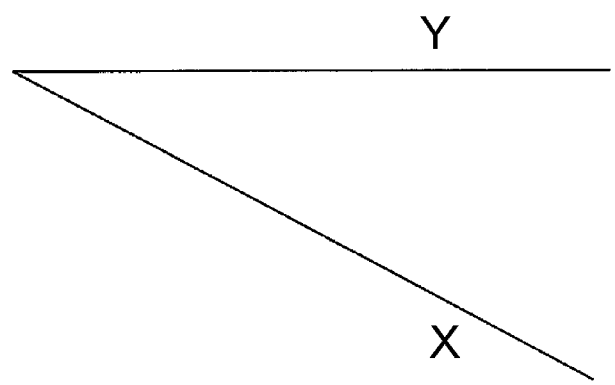
FIG. 1 illustrates a tool having a rake face (Y) and a flank face (X).

A cutting tool according to the present invention includes a cutting edge composed of a polycrystalline body including high-pressure-phase hard grains that contain one or more elements selected from the group consisting of boron, carbon, and nitrogen, the polycrystalline body being formed by subjecting a non-diamond carbon material and/or boron nitride, serving as a starting material, to direct conversion sintering under ultra-high pressure and high temperature without adding a sintering aid or a catalyst. Letting the radius of curvature of the nose of the cutting edge of the cutting tool be R1, the sintered grains constituting the polycrystalline body have an average grain size of 1.2×R1 or less and a maximum grain size of 2×R1 or less. The high-pressure-phase hard grains containing one or more elements selected from the group consisting of boron, carbon, and nitrogen described here indicate diamond, cubic boron nitride and/or wurtzite boron nitride, or $BC_2N$ having a diamond structure.

In the cutting tool of the present invention for ultra-precision machining, the polycrystalline body is preferably composed of polycrystalline diamond consisting substantially of diamond alone, the polycrystalline diamond being formed by subjecting a non-diamond carbon material, serving as a starting material, to direct conversion sintering into diamond under ultra-high pressure and high temperature without adding a sintering aid or a catalyst. Alternatively, the polycrystalline body is preferably composed of polycrystalline boron nitride consisting substantially of high-pressure-phase boron nitride alone, the polycrystalline boron nitride being formed by subjecting low-pressure-phase boron nitride, serving as a starting material, to direct conversion sintering into high-pressure-phase boron nitride under ultra-high pressure and high temperature without adding a sintering aid or a catalyst. The high-pressure-phase boron nitride is preferably cubic boron nitride and/or wurtzite boron nitride.

In the present invention, a cutting tool including a cutting edge composed of diamond, and a cutting tool including a cutting edge composed of boron nitride will be mainly described in detail below. However, the present invention is not limited thereto. A cutting tool including a cutting edge composed of a polycrystalline body composed of, for example, $BC_2N$ having a diamond structure may be similarly produced, the polycrystalline body containing high-pressure-phase hard grains composed of one or more elements selected from the group consisting of boron, carbon, and nitrogen, and the high-pressure-phase hard grains being formed by direct conversion sintering under ultra-high pressure and high temperature without a sintering aid or a catalyst. The same effects can also be provided.

Among the cutting tools according to the present invention, a diamond polycrystalline body constituting a diamond tool will be described in detail below.

The diamond polycrystalline body which consists substantially of single-phase diamond (purity: 99% or more), which serves as a material for the cutting tool of the present invention, and which does not contain a metal binder, such as cobalt, may be obtained by directly converting non-diamond carbon, e.g., black lead (graphite), glassy carbon, or amorphous carbon, serving as a raw material, into diamond and simultaneously sintering the diamond under ultra-high pressure and high temperature (temperature: 1800 to 2600° C., pressure: 12 to 25 GPa) in the absence of a catalyst or a solvent. In the resulting diamond tool composed of the polycrystalline diamond, uneven wear, which is observed in a single-crystal diamond tool, does not occur.

Methods for obtaining dense, high-purity polycrystalline diamonds by subjecting high-purity graphite, serving as a starting material, to direct conversion sintering by indirect heating at an ultra-high pressure of 12 GPa or more and a high temperature of 2200° C. or higher are disclosed in, for example, literature described below.

NPL 3: SEI Technical Review 165 (2004) 68
PTL 9: Japanese Unexamined Patent Application Publication No. 2007-22888
PTL 10: Japanese Patent No. 4275896

Diamond tools were produced from diamonds obtained by the methods described in the literature. The workability of the resulting diamond tools was evaluated.

Presumably because the diamond described in NPL 3 contained abnormally grown grains having a size of about 10 times the average grain size and the diamond described in PTL 6 contained coarse diamond grains that were converted from an added coarse raw material, the evaluation revealed that portions having such coarse grains wore extremely. In this case, for example, such portions caused streaky scratches on a workpiece; hence, desired working was not performed, which was a problem. In particular, if a grain having a size greatly exceeding the target radius of curvature of a cutting edge was present, the shape of the cutting edge was changed when cutting was performed for prolonged periods of time. The performance was not sufficient for ultra-precision machining.

Accordingly, the results demonstrated that the grain size distribution of the sintered diamond grains constituting polycrystalline diamond needs to be controlled in response to the radius of curvature of the cutting edge. In the case where a diamond tool with a controlled grain size distribution was produced, grains that wore extremely were not present, and desired working was stably performed for prolonged periods of time.

It was found that the foregoing problem was solved by controlling the average grain size $D_{50}$ and the maximum grain size Dmax of sintered grains of a material for a diamond tool in response to the radius of curvature R1 of a cutting edge.

That is, letting the radius of curvature of the nose of the cutting edge of a cutting tool be R1, a diamond polycrystalline body satisfying $D_{50} \leq 1.2 \times R1$ and $Dmax \leq 2 \times R1$ is used.

Letting the radius of curvature of a ridge between a rake face and a flank face of the cutting tool be R2, the polycrystalline body satisfying $D_{50} \leq 1.2 \times R2$ and $Dmax \leq 2 \times R2$ is preferably used.

Letting the radius of curvature of a ridge between two flank faces of the cutting tool be R3, the polycrystalline body satisfying $D_{50} \leq 1.2 \times R3$ and $Dmax \leq 2 \times R3$ is preferably used.

Preferably, the radius of curvature of each of the nose of the cutting edge, the ridge between the rake face and the flank face, and the ridge between the two flank faces of the cutting tool is 50 nm or less, $D_{50} \leq 60$ nm, and $Dmax \leq 100$ nm, from the viewpoint of performing ultra-precision machining.

Figure 11:
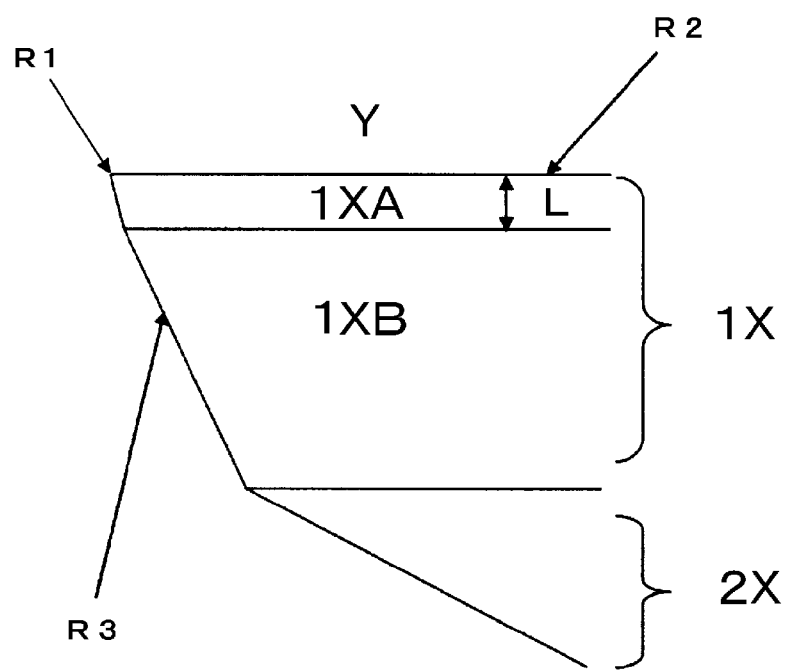
FIG. 11 illustrates measurement points of R1, R2, and R3 in a tool.
Figure 11:
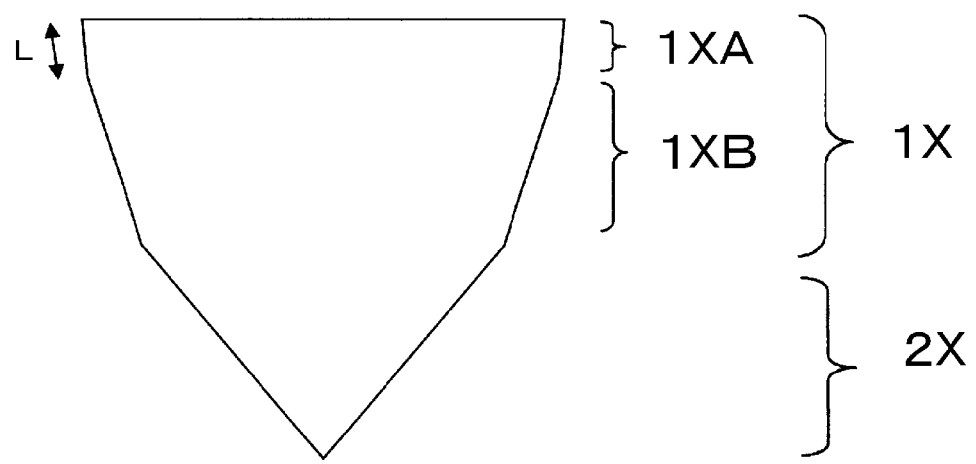

FIG. 11 illustrates portions of the tool where R1, R2, and R3 in the present invention are measured. As illustrated in FIG. 11, when the flank face is divided into three sections of a first flank face A (1XA), a first flank face B (1XB), and a second flank face (2X), R3 represents the radius of curvature of a ridge between the first flank faces B (1XB) that are located between the first flank face A (1XA) and the second flank face (2X). When the flank face is divided into two sections of a first flank face and a second flank face, R3 represents the radius of curvature of a ridge between the first flank faces closer to the rake face. R2 represents the radius of curvature of a ridge between the rake face (Y) and the flank face (X) (in FIG. 11, the first flank face A (1XA)). R1 represents the radius of curvature of the cutting edge of the nose of the tool.

In the cutting tool of the present invention, polycrystalline diamond is characterized in that the intergranular bonding strength of diamond is higher than the intragranular bonding strength. If the cutting edge portion of the tool is composed of a single diamond grain only, fracture is caused by, for example, the occurrence of intragranular cleavage. In the case where the grain size is in the above range, an intergranular network is always contained in the cutting edge, thereby resulting in the tool having high fracture resistance.

The average grain size of the polycrystalline diamond preferably satisfies $D_{50} \geq 0.01 \times R1$, $D_{50} \geq 0.01 \times R2$, and $D_{50} \geq 0.01 \times R3$, wherein R1, R2, and R3 represent the radii of curvature of the cutting edge. It was found that at a grain size less than this value, it was practically difficult to synthesize polycrystalline diamond with sp3 bonds maintained. In fact, sp2 bonds are contained, thereby reducing wear resistance and fracture resistance.

In the case where the foregoing polycrystalline diamond having a fine grain size was subjected to ultra-precision machining, there was a problem in which even if polishing was performed in such a way as to machine a conventional single-crystal tool, a microcrack occurred, thereby causing difficulty in forming a straight cutting edge. Even if the straight cutting edge was formed, there was another problem in which machining damage, e.g., a microcrack or strain, was introduced into the texture of the polycrystalline diamond by polishing, thereby reducing tool life. Accordingly, after rough machining by polishing, a sharp cutting edge should be formed by machining with a focused ion beam. However, as described above, any of cutting edge lines, for example, a ridge between the rake face and the flank face, and/or a ridge between two flank faces, was not sharpened by a conventional method.

The inventors produced a novel cutting tool for ultra-precision machining by machining described below.

Figure 2:
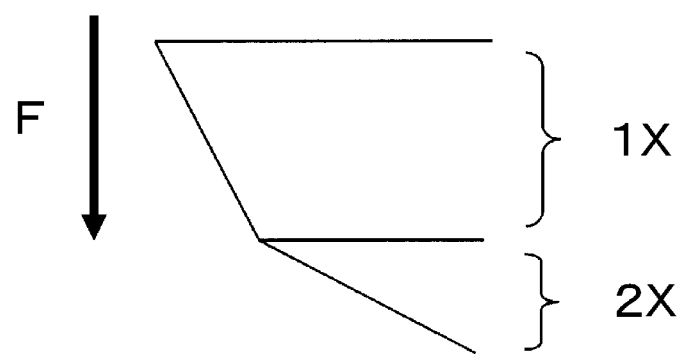
FIG. 2 illustrates the shape of a tool obtained by subjecting the tool illustrated in FIG. 1 to high-precision machining with a focused ion beam directed from the rake face (Y) side to the flank face (X) side.
Figure 3:
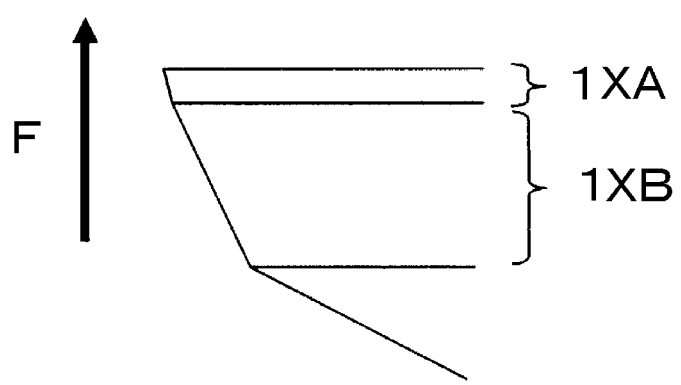
FIG. 3 illustrates the shape of a tool obtained by subjecting the tool illustrated in FIG. 2 to high-precision machining with a focused ion beam directed from the flank face (X) side to the rake face (Y) side.
Figure 4:
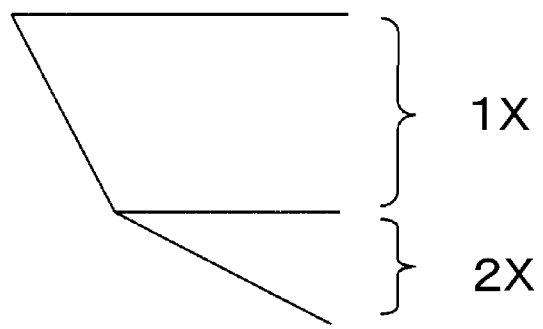
FIG. 4 illustrates the shape of a tool obtained by subjecting the first flank face (second flank face (2X)) of the tool illustrated in FIG. 1 to finishing polishing processing to form a first flank face (1X).

First, the rake face (Y) and the flank face (X) are roughly formed by machining (FIG. 1). With respect to a subsequent step of forming a cutting edge with high precision, in a conventional method as illustrated in FIG. 4, the resulting roughly machined surface was defined as the second flank face (2X), and the first flank face (1X) was formed by finishing polishing. In contrast, in the present invention, in order to sharpen a ridge R3 between two flank faces, high-precision machining is first performed by directing a focused ion beam from the rake face (Y) to the flank face (X) side (FIG. 2). A ridge between the rake face (Y) and the flank face (X), and the nose of the cutting edge are slightly rounded by this machining. Finally, high-precision machining is performed by directing a focused ion beam from the flank side (X) to the rake face (Y) (FIG. 3). Here, the surface that has first been machined by FIB is defined as the flank face B (1XB). The surface that has finally been machined by FIB is defined as the flank face A (1XA). The foregoing machining enables the production of the tool whose all radii of curvature R1, R2, and R3 are highly precise and which has never been produced by conventional machining methods. Note that R3 described here indicates, in particular, a ridge between two flank faces B (1XB).

A distance (L) from the boundary between the flank face A (1XA) and the rake face (Y) to the boundary between the flank face A (1XA) and the flank face B (1XB) is preferably 3 μm or less. In the case of a distance more than 3 μm, for example, the ridge R3 between the two flank faces is rounded, thereby failing to produce a high-precision tool.

The polycrystalline diamond used in the cutting tool of the present invention may possess electrical conductivity. In this case, the foregoing rough machining of the flank face or the like may be performed by not only conventional polishing but also less expensive electrical discharge machining. In ultra-precision machining, it is difficult to make a determination as to whether a tool is in contact with a workpiece or not. By imparting electrical conductivity, contact may be precisely determined with an electrical sensor. To impart the electrical conductivity, for example, doping of boron, phosphorus, or hydrogen may be performed. Alternatively, a surface may be coated with a conductive film composed of, for example, a metal.

The inventors found that in the case where the rake face and the flank face are formed by polishing, a microcrack and so forth occur in polycrystalline diamond by polishing to reduce the strength of the tool. Thus, it was found that after rough machining for the rake face and the flank face is performed by polishing, a step of forming the rake face and the flank face by dry etching, such as reactive ion etching, is performed, thereby producing a tool with good fracture resistance. In the case where dry etching is not performed, preferably, the amount machined by a focused ion beam is increased, and polycrystalline diamond is polished to a depth of at least 5 μm or more from a surface to be polished.

The foregoing production method is summarized below.

The polycrystalline diamond cutting tool of the present invention may be produced by the method that includes a step of subjecting a non-diamond carbon material, serving as a starting material, to direct conversion sintering into diamond under ultra-high pressure and high temperature without adding a sintering aid or a catalyst, a step of cutting the diamond with a laser into a tip shape,
a step of bonding the resulting diamond tip to a shank,
a step of polishing the diamond tip to form a rake face and a flank face,
a step of forming a mask on the diamond tip,
a step of forming the rake face and the flank face by dry etching, and
a step of machining a boundary portion between the rake face and the flank face with a focused ion beam.

The ultra-precision tool is applicable to any of V-shaped tools, fly cutters, and micro-grooving tools.

Next, among the cutting tools according to the present invention, a boron nitride polycrystalline body constituting a boron nitride tool will be described in detail below.

A high-pressure-phase boron nitride polycrystalline body which serves as a material for the cutting tool of the present invention, which does not contain a metal binder, such as cobalt, and which consists substantially of single-phase boron nitride (purity: 99% or more) may be obtained by directly converting low-pressure-phase boron nitride (hexagonal boron nitride, hBN), serving as a raw material, into high-pressure-phase boron nitride and simultaneously sintering the high-pressure-phase boron nitride under ultra-high pressure and high temperature (temperature: 1100° C. to 2600° C., pressure: 12 to 25 GPa) in the absence of a catalyst or a solvent. The high-pressure-phase boron nitride described here indicates cubic boron nitride (cBN) and compressed hexagonal boron nitride (wurtzite boron nitride, wBN). The resulting boron nitride tool composed of the high-pressure-phase boron nitride polycrystalline body has a small grain size, and is not fractured or worn unevenly.

PTL 6 and NPL 4 disclose methods for obtaining dense, high-purity cubic boron nitride by subjecting low-pressure-phase boron nitride, serving as a starting material, to direct conversion sintering by indirect heating at an ultra-high pressure of 9 GPa or more and a high temperature of 1700° C. or higher and 1900° C. or lower.

NPL 4: Machines and Tools, March issue, 2010, page 80

Boron nitride tools were produced from cubic boron nitrides obtained by the methods described in the literature. The workability of the resulting boron nitride tools was evaluated. Presumably because the boron nitride described in PTL 6 contained abnormally grown grains having a size of more than 200 nm as illustrated in FIG. 1 of NPL 4, the evaluation revealed that portions having such coarse grains wore extremely. In this case, for example, such portions caused streaky scratches on a workpiece; hence, desired working was not performed, which was a problem. In particular, if a grain having a size greatly exceeding the target radius of curvature of a cutting edge was present, the shape of the cutting edge was changed when cutting was performed for prolonged periods of time. The performance was not sufficient for ultra-precision machining.

Accordingly, the results demonstrated that the grain size distribution of the sintered boron nitride grains constituting polycrystalline boron nitride needs to be controlled in response to the radius of curvature of the cutting edge. In the case where a high-pressure-phase boron nitride tool with a controlled grain size distribution was produced, grains that wore extremely were not present, and desired working was stably performed for prolonged periods of time.

It was found that the foregoing problem was solved by controlling the average grain size $D_{50}$ and the maximum grain size Dmax of sintered grains of a material for a high-pressure-phase boron nitride tool in response to the radius of curvature R1 of a cutting edge.

That is, letting the radius of curvature of the nose of the cutting edge of a cutting tool be R1, a polycrystalline body satisfying $D_{50} \leq 1.2 \times R1$ and $Dmax \leq 2 \times R1$ is used.

Letting the radius of curvature of a ridge between a rake face and a flank face of the cutting tool be R2, the polycrystalline body satisfying $D_{50} \leq 1.2 \times R2$ and $Dmax \leq 2 \times R2$ is preferably used.

Letting the radius of curvature of a ridge between two flank faces of the cutting tool be R3, the polycrystalline body satisfying $D_{50} \leq 1.2 \times R3$ and $Dmax \leq 2 \times R3$ is preferably used.

Preferably, the radius of curvature of each of the nose of the cutting edge, the ridge between the rake face and the flank face, and the ridge between the two flank faces of the cutting tool is 50 nm or less, $D_{50} \leq 60$ nm, and $Dmax \leq 100$ nm, from the viewpoint of performing ultra-precision machining.

In the present invention, R1, R2, and R3 in the cutting tool including the cutting edge composed of boron nitride are the same as those described in the cutting tool including the cutting edge composed of diamond and are illustrated in FIG. 11.

The high-pressure-phase boron nitride polycrystalline body of the present invention is characterized in that the intergranular bonding strength and the intragranular bonding strength of boron nitride are high and in the same level. If the cutting edge portion of the tool is composed of a single boron nitride grain only, fracture is caused by, for example, the occurrence of intragranular cleavage. In the case where the grain size is in the above range, an intergranular network is always contained in the cutting edge. Even if cleavage occurs, fracture is stopped at a boundary between grains, thereby resulting in the tool having high fracture resistance.

The average grain size $D_{50}$ of the sintered boron nitride grains constituting the high-pressure-phase boron nitride polycrystalline body preferably satisfies $D_{50} \geq 0.01 \times R1$, $D_{50} \geq 0.01 \times R2$, and $D_{50} \geq 0.01 \times R3$, wherein R1, R2, and R3 represent the radii of curvature. It was found that at a grain size of this value or less, it was practically difficult to synthesize the high-pressure-phase boron nitride polycrystalline body with sp3 bonds maintained. In fact, sp2 bonds are contained, thereby reducing wear resistance and fracture resistance.

In the case where the foregoing high-pressure-phase boron nitride polycrystalline body having a fine grain size was subjected to ultra-precision machining, there was a problem in which even if polishing was performed in such a way as to machine a conventional boron nitride tool, a microcrack occurred, thereby causing difficulty in forming a straight cutting edge. Even if the straight cutting edge was formed, there was another problem in which machining damage, e.g., a microcrack or strain, was introduced into the texture of the high-pressure-phase boron nitride polycrystalline body by polishing, thereby reducing tool life. Accordingly, after rough machining by polishing, a sharp cutting edge should be formed by machining with a focused ion beam. However, as described above, any of cutting edge lines, for example, a ridge between the rake face and the flank face, and/or a ridge between two flank faces, was not sharpened by a conventional method.

The inventors have conducted various studies and have found that also in the case of a cutting tool including a cutting edge composed of boron nitride, machining was performed in the same way as in the case of the cutting tool including the cutting edge composed of diamond, thereby producing a novel cutting tool for ultra-precision machining. That is, it is possible to produce the cutting tool of the present invention by the foregoing machining method illustrated in FIGS. 1 to 3.

The boron nitride polycrystalline body used in the cutting tool of the present invention may possess electrical conductivity. As a result, contact between the tool and a workpiece may be precisely determined with an electrical sensor. To impart the electrical conductivity, a conductive material, such as a metal, may be thinly deposited on a surface.

The ultra-precision tool is applicable to any of V-shaped tools, fly cutters, and micro-grooving tools.

The boron nitride cutting tool of the present invention may be produced by machining polycrystalline boron nitride consisting substantially of high-pressure-phase boron nitride, the polycrystalline boron nitride being formed by subjecting low-pressure-phase boron nitride, serving as a starting material, to direct conversion sintering into high-pressure-phase boron nitride under ultra-high pressure and high temperature without adding a sintering aid or a catalyst.

Examples of a machining method may include two machining methods described below.

<Machining Method A>
A method in which the following steps are sequentially performed:
(1) a step of cutting the polycrystalline boron nitride with a laser into a tip shape,
(2) a step of bonding the resulting boron nitride tip to a shank,
(3) a step of polishing the boron nitride tip to form a rake face and a flank face, and
(4) a step of machining a boundary portion between the rake face and the flank face with a focused ion beam.

<Machining Method B>
A method in which the following steps are sequentially performed:
(1) a step of cutting boron nitride with a laser into a tip shape,
(2) a step of bonding the resulting boron nitride tip to a shank,
(3) a step of polishing the boron nitride tip to form a rake face and a flank face,
(4) a step of forming a mask on the boron nitride tip,
(5) a step of forming the rake face and the flank face by dry etching, and
(6) a step of machining a boundary portion between the rake face and the flank face with a focused ion beam.

Next, among the cutting tools according to the present invention, a $BC_2N$ polycrystalline body constituting a $BC_2N$ tool will be described in detail below.

A $BC_2N$ polycrystalline body which serves as a material for the cutting tool of the present invention, which does not contain a metal binder, such as cobalt, and which consists substantially of single-phase $BC_2N$ (purity: 99% or more) may be obtained by directly converting non-diamond $BC_2N$, such as low-pressure-phase $BC_2N$ (graphite-like $BC_2N$), serving as a raw material, into high-pressure-phase $BC_2N$ (diamond structure) and simultaneously sintering the high-pressure-phase $BC_2N$ under ultra-high pressure and high temperature (temperature: 1800° C. to 2600° C., pressure: 12 to 25 GPa) in the absence of a catalyst or a solvent. In the resulting $BC_2N$ tool composed of the polycrystalline $BC_2N$, uneven wear, which is observed in a single-crystal $BC_2N$ tool, does not occur.

Graphite-like $BC_2N$ may be synthesized by nitridation of boric acid and carbonization of saccharose in molten urea. Alternatively, graphite-like $BC_2N$ may be synthesized by feeding $BCl_3$ gas and acetonitrile into a reaction tube in a molar ratio of 1:1 to deposit a graphite-like $BC_2N$ film on carbon heated by high-frequency induction heating.

A cutting tool of the present invention is obtained by controlling the average grain size $D_{50}$ and the maximum grain size Dmax of sintered grains of a material for such a $BC_2N$ tool in response to the radius of curvature R1 of a cutting edge. That is, letting the radius of curvature of the nose of the cutting edge of a cutting tool be R1, a polycrystalline body satisfying $D_{50} \leq 1.2 \times R1$ and $Dmax \leq 2 \times R1$ is used.

Letting the radius of curvature of a ridge between a rake face and a flank face of the cutting tool be R2, the polycrystalline body satisfying $D_{50} \leq 1.2 \times R2$ and $Dmax \leq 2 \times R2$ is preferably used.

Letting the radius of curvature of a ridge between two flank faces of the cutting tool be R3, the polycrystalline body satisfying $D_{50} \leq 1.2 \times R3$ and $Dmax \leq 2 \times R3$ is preferably used.

Preferably, the radius of curvature of each of the nose of the cutting edge, the ridge between the rake face and the flank face, and the ridge between the two flank faces of the cutting tool is 50 nm or less, $D_{50} \leq 60$ nm, and $Dmax \leq 100$ nm, from the viewpoint of performing ultra-precision machining.

In the present invention, R1, R2, and R3 in the cutting tool including the cutting edge composed of the $BC_2N$ polycrystalline body are the same as those described in the cutting tool including the cutting edge composed of diamond and are illustrated in FIG. 11.

Also in the case of a cutting tool including a cutting edge composed of the $BC_2N$ polycrystalline body, machining was performed in the same way as in the case of the cutting tool including the cutting edge composed of diamond, thereby producing a novel cutting tool for ultra-precision machining. That is, it is possible to produce the cutting tool of the present invention by the foregoing machining method illustrated in FIGS. 1 to 3.

The $BC_2N$ polycrystalline body used in the cutting tool of the present invention may possess electrical conductivity. As a result, contact between the tool and a workpiece may be precisely determined with an electrical sensor. To impart the electrical conductivity, a conductive material, such as a metal, may be thinly deposited on a surface.

The ultra-precision tool is applicable to any of V-shaped tools, fly cutters, and micro-grooving tools.

EXAMPLES

While the present invention will be described in detail below by examples and comparative examples, these examples are illustrative. The scope of the present invention is not limited to these examples.

To begin with, measurement and evaluation methods will be described.

<Average Grain Size>

In the present invention, the average grain sizes ($D_{50}$) and the maximum grain sizes (Dmax) of graphite grains in the fired graphite body serving as a raw material, sintered diamond grains in a diamond polycrystalline body, low-pressure-phase (hexagonal) boron nitride grains, and sintered boron nitride grains in a high-pressure-phase boron nitride polycrystalline body were determined by performing image analysis on the basis of photographic images taken with a scanning electron microscope at a magnification of 100,000 to 500,000.

This method will be described in detail below.

A surface of a sample is subjected to finishing polishing or processing with a Cross-Section Polisher (CP). The resulting sample is observed with the scanning electron microscope to capture an image. The grain size distribution of crystal grains constituting a sintered compact is measured on the basis of the image. Specifically, each of the grains is sampled and subjected to binarization, and the area (S) of each grain is calculated with image analysis software (for example, Scion Image manufactured by Scion Corporation). The grain size (D) of each grain is calculated as the diameter ($D=2\sqrt{(S/\pi)}$) of a circle having the same area as the grain.

Then the resulting grain size distribution is processed with data analysis software ((for example, Origin manufactured by OriginLab Corporation or Mathchad manufactured by Parametric Technology Corporation) to calculate the $D_{50}$ grain size and the maximum grain size Dmax.

In examples and comparative examples described below, JSM-7600F manufactured by JEOL Ltd. was used as the scanning electron microscope.

Example 1

Graphite having a grain size of 0.1 to 10 μm and a purity of 99.9% or more was charged into a Mo capsule and treated with a belt-type ultrahigh-pressure-generating apparatus at 10 GPa and 2100° C. for 30 minutes to form polycrystalline diamond. The grain size of the sample was observed with the electron microscope. Table I describes the average grain size and the maximum grain size.

Rough machining was performed by laser cutting and polishing to form a tip-shaped piece. The tip-shaped piece was brazed to a shank. Then a rake face and a flank face of a V-shaped tool were formed by rough polishing.

Figure 5:
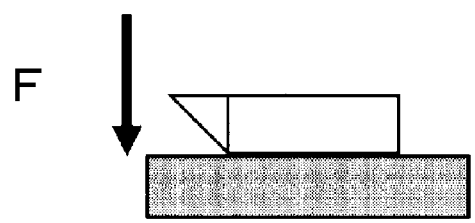
FIG. 5 illustrates a state in which a tool is machined using a focused ion beam with the beam directed from the rake face (Y) side to the flank face (X) side.

Next, as illustrated in FIG. 5, the tool was mounted on a stage in such a manner that a beam was directed from the rake face (Y) side to the flank face (X) side and transferred into a focused ion beam apparatus. A flank faces B (1XB) was formed on each side of the V-shaped tool at an ion current of 1000 pA or less. A ridge between the two flank faces was observed with the tool tilted. The radius of curvature R3 is described in Table I.

Figure 6:
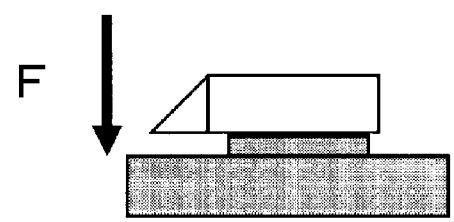
FIG. 6 illustrates a state in which a tool is machined using a focused ion beam with the beam directed from the flank face (X) side to the rake face (Y) side.

Next, the tool was taken out, mounted on the stage in such a manner that a beam was directed from the flank face (X) side to the rake face (Y) side as illustrated in FIG. 6, and transferred into the focused ion beam apparatus. A flank face A (1XA) was formed on each side of the V-shaped tool at an ion current of 500 pA or less. Table I describes the radius of curvature R1 of the cutting edge, the radius of curvature R2 of a ridge between the rake face (Y) and the flank face (1XA), and a distance L from a boundary between the flank face A (1XA) and the rake face (Y) to a boundary between the flank face A (1XA) and the flank face B (1XB).

Figure 7:
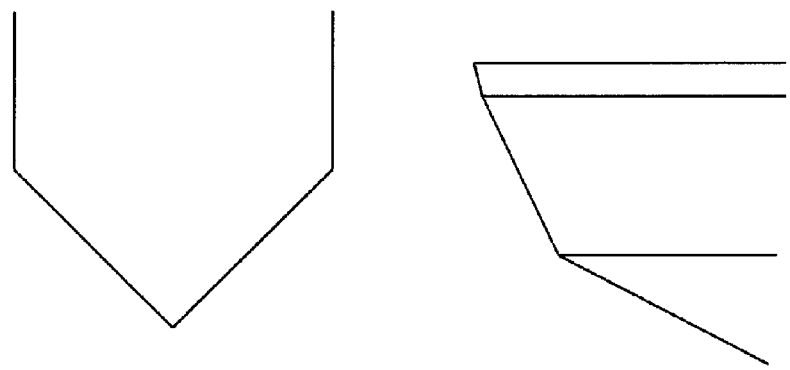
FIG. 7 illustrates a V-shaped tool as a cutting tool according to an aspect of the present invention.
Figure 8:
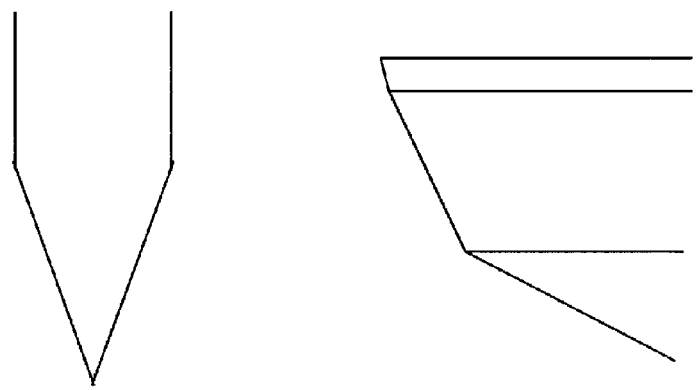
FIG. 8 illustrates a sharp V-shaped tool as a cutting tool according to an aspect of the present invention.

By the foregoing machining, the V-shaped tool having a nose angle of 90° as illustrated in FIG. 7 was completed. A sharp V-shaped tool having a nose angle of 40° or less as illustrated in FIG. 8 may be produced in the same way as above.

Next, the tool was mounted on an ultra-precision nano-processing machine. A workpiece mainly composed of WC—Co—Ni was subjected to grooving at a feed speed of 10 mm/min, a depth of cut of 300 μm, and a cut length of 1000 mm. The cutting results are summarized in Table I.

Example 2

A V-shaped tool was produced as in Example 1, except that nano-polycrystalline diamond having a grain size smaller than that in Example 1 was used.

Example 3

A V-shaped tool was produced as in Example 1, except that conductive nano-polycrystalline diamond doped with boron was used.

Comparative Examples 1 to 7

As comparative examples, an example in which single-crystal diamond was used, examples in which polycrystalline diamonds having different grain sizes were used, and examples in which different machining methods were employed are described in Table I.

As described in Table I, in any of the comparative examples, the shape defect of the groove occurred because of fracture during machining or lack of wear resistance. In Comparative Example 7, in particular, machining was performed without using a focused ion beam. Fracture during machining occurred frequently. It was thus impossible to produce a tool having R1, R2, and R3 that were all sharp. A tool in which only R1 was sharp was successfully produced. However, fracture of the tool occurred at an early stage, compared with a tool produced with the focused ion beam. Furthermore, fracture of cutting edge lines between the rake face and the flank faces occurred frequently because of damage by polishing. A groove having large surface roughness was formed from the early stage of machining. In contrast, in the case of the cutting tool of the present invention for ultra-precision machining, a groove with a radius of curvature of 100 nm or less throughout its length was formed without fracture.

TABLE I

| | | Edge material | FIB machining | Tool shape | | | | | | Results of machining | | |
|---|---|---|---|---|---|---|---|---|---|---|---|---|
| | | | | Average grain size nm | Maximum grain size nm | R1 nm | R2 nm | R3 nm | L μm | Presence or absence of fracture | Wear resistance | Machined shape |
| Example | 1 | poly-crystalline diamond | FIB machining 1*[1] FIB machining 2*[2] | 40 | 80 | 44 | 50 | 52 | 1 | absent | high | groove with a radius of curvature of 100 nm or less throughout its length |
| | 2 | poly-crystalline diamond | ↑ | 15 | 35 | 40 | 51 | 48 | 1 | absent | high | groove with a radius of curvature of 100 nm or less throughout its length |
| | 3 | boron-doped poly-crystalline diamond | ↑ | 55 | 95 | 48 | 51 | 48 | 1 | absent | high | groove with a radius of curvature of 100 nm or less throughout its length |
| Comparative Example | 1 | single-crystal diamond | ↑ | — | — | 49 | 49 | 52 | 1 | present at 280-mm point | low | bad |
| | 2 | poly-crystalline diamond | ↑ | 1000 | 3000 | 54 | 52 | 50 | 1 | present at 310-mm point | low | bad |
| | 3 | poly-crystalline diamond | ↑ | 80 | 200 | 51 | 48 | 55 | 1 | present at 710-mm point | low | bad |
| | 4 | poly-crystalline diamond | only FIB machining 1 | 60 | 110 | 49 | 155 | 49 | 1 | absent | middle | groove with a radius of curvature of 100 nm or more from 440-mm point |
| | 5 | poly-crystalline diamond | only FIB machining 2 | 62 | 120 | 50 | 52 | 220 | 1 | absent | middle | groove with a radius of curvature of 100 nm or more from 290-mm point |
| | 6 | poly-crystalline diamond | FIB machining 1 FIB machining 2 | 60 | 100 | 47 | 47 | 94 | 5 | absent | middle | groove with a radius of curvature of 100 nm or more from 310-mm point |
| | 7 | poly-crystalline diamond | without FIB machining | 55 | 95 | 44 | 140 | 140 | absent | present at 60-mm point | low | bad |

*[1] machining to form flank face B with a focused ion beam directed from the rake face side to the flank side.
*[2] machining to form flank face A with a focused ion beam directed from the flank side to the rake face side.

Example 4

Graphite having a grain size of 0.1 to 10 μm and a purity of 99.9% or more was charged into a Mo capsule and treated with a belt-type ultrahigh-pressure-generating apparatus at 10 GPa and 2100° C. for 30 minutes to form polycrystalline diamond. The grain size of the sample was observed with the electron microscope. The average grain size was 30 nm. The maximum grain size was 90 nm.

Figure 9:
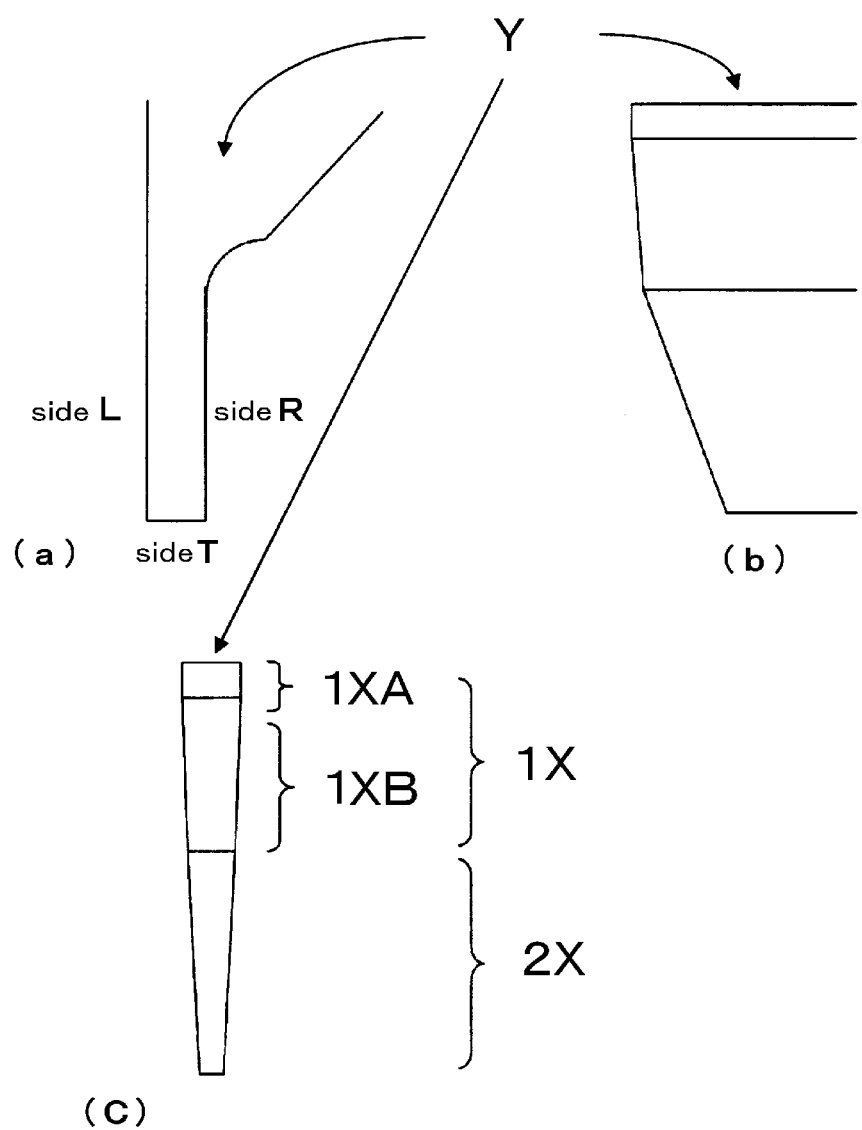
FIG. 9 illustrates shapes of cutting tools obtained in Examples 4 and 8, (a) is a top view of each of the cutting tools when viewed from the rake face side, (b) is a side view of each of the tools when viewed from the right side, and (c) is a front view of each of the tools when viewed from the front end face.
Figure 10:
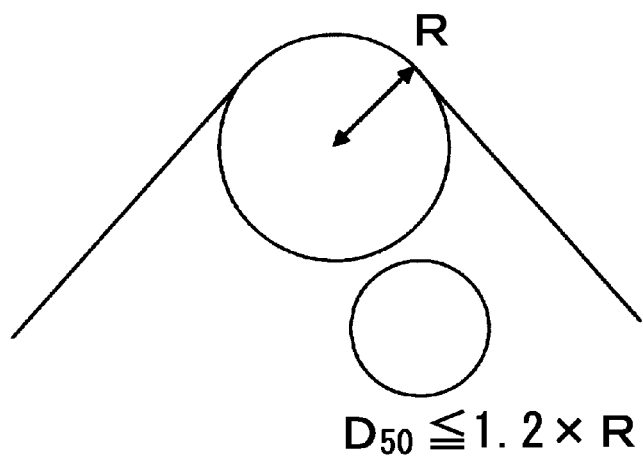
FIG. 10 illustrates the relationships among the radius of curvature R, the average grain size $D_{50}$, and the maximum grain size Dmax.
Figure 10:
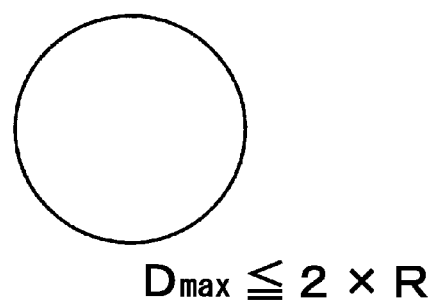

Rough machining was performed by laser cutting and polishing to form a tip-shaped piece. The tip-shaped piece was brazed to a shank. Then a rake face (Y) and a second flank face (2X) of a grooving tool were formed by rough polishing, as illustrated in FIG. 9.

Next, as illustrated in FIG. 5, the tool was mounted on a stage in such a manner that a beam was directed from the rake face (Y) side to the flank face (X) side and transferred into a focused ion beam apparatus. A flank face B (1XB) was formed on each of the side faces L and R of the grooving tool at an ion current of 1000 pA or less. Then, a flank face B (1XB) was formed on the front end face T of the grooving tool. Table II describes the radius of curvature R3R of a ridge between two flank faces, i.e., the side face R and the front end face T, and the radius of curvature R3L of a ridge between two flank faces, i.e., the side face L and the front end face T.

Next, the tool was taken out, mounted on the stage in such a manner that a beam was directed from the flank face (X) side to the rake face (Y) side as illustrated in FIG. 6, and transferred into the focused ion beam apparatus. A flank face A (1XA) was formed on each of the side faces L and R of the grooving tool at an ion current of 500 pA or less. Finally, a flank face A (1XA) was formed on the front end face T of the grooving tool, thereby completing the grooving tool. Table II describes the radius of curvature R1R of the cutting edge defined by the side face R and the front end face T, the radius of curvature R1L defined by the side face L and the front end face T, the radii of curvature R2R, R2L, and R2T of ridges between the rake face and the flank faces, i.e., the side face R, the side face L, and the front end face T, and the distances LR, LL, and LT from ends of the flank face A to the rake face.

Next, the tool was mounted on an ultra-precision nano-processing machine. A workpiece mainly composed of WC—Co—Ni was subjected to grooving at a feed speed of 10 mm/min, a depth of cut of 200 μm, and a cut length of 1000 mm. In the cutting tool of the present invention for ultra-precision machining, a groove with a radius of curvature of 100 nm or less throughout its length was formed without fracture.

TABLE II

| | | | Tool shape | | | | | | | |
|---|---|---|---|---|---|---|---|---|---|---|
| | Edge material | FIB machining | Average grain size nm | Maximum grain size nm | R1R nm | R1L nm | R2R nm | R2L nm | R2T nm | R3R nm |
| Example 4 | polycrystalline diamond | FIB machining 1 FIB machining 2 | 30 | 90 | 46 | 54 | 52 | 49 | 55 | 45 |

| | Tool shape | | | Results of machining | | |
|---|---|---|---|---|---|---|
| | R3L nm | LR μm | LL μm | LT μm | Presence or absence of fracture | Wear resistance | Machined shape |
| Example 4 | 50 | 1 | 1 | 1 | absent | high | groove with a radius of curvature of 100 nm or less throughout its length |

Example 5

Hexagonal boron nitride having a grain size of 0.1 to 10 μm and a purity of 99.9% or more was charged into a Mo capsule and treated with a belt-type ultrahigh-pressure-generating apparatus at 13 GPa and 1650° C. for 30 minutes to form a high-pressure-phase boron nitride polycrystalline body. The crystal structure was identified by X-ray diffraction. The grain size of the sample was observed with the electron microscope. Table III describes the average grain size and the maximum grain size.

Rough machining was performed by laser cutting and polishing to form a tip-shaped piece. The tip-shaped piece was brazed to a shank. Then a rake face and a flank face of a V-shaped tool were formed by rough polishing.

Next, as illustrated in FIG. 5, the tool was mounted on a stage in such a manner that a beam was directed from the rake face (Y) side to the flank face (X) side and transferred into a focused ion beam apparatus. A flank faces B (1XB) was formed on each side of the V-shaped tool at an ion current of 1000 pA or less. A ridge between the two flank faces was observed with the tool tilted. The radius of curvature R3 is described in Table III.

Next, the tool was taken out, mounted on the stage in such a manner that a beam was directed from the flank face (X) side to the rake face (Y) side as illustrated in FIG. 6, and transferred into the focused ion beam apparatus. A flank face A (1XA) was formed on each side of the V-shaped tool at an ion current of 500 pA or less. Table III describes the radius of curvature R1 of the cutting edge, the radius of curvature R2 of a ridge between the rake face (Y) and the flank face (1XA), and a distance L from a boundary between the flank face A (1XA) and the rake face (Y) to a boundary between the flank face A (1XA) and the flank face B (1XB).

By the foregoing machining, the V-shaped tool having a nose angle of 90° as illustrated in FIG. 7 was completed. A sharp V-shaped tool having a nose angle of 40° or less as illustrated in FIG. 8 may be produced in the same way as above.

Next, the tool was mounted on an ultra-precision nano-processing machine. A workpiece composed of stainless steel (SUS 304) was subjected to grooving at a feed speed of 2 m/min, a depth of cut of 5 μm, and a cut length of 300 mm. The cutting results are summarized in Table III.

Example 6

A V-shaped tool was produced as in Example 5, except that the high-pressure-phase boron nitride contained cubic boron nitride and contained, in part, wurtzite boron nitride and that the high-pressure-phase boron nitride had a smaller grain size.

Example 7

A V-shaped tool was produced as in Example 5, except that the grain size was different from that in Example 5.

Comparative Examples 9 to 14

As comparative examples, an example in which single-crystal diamond was used, examples in which high-pressure-phase boron nitrides having different grain sizes were used, and examples in which different machining methods were employed are described in Table III.

In any of the comparative examples, the shape defect of the groove occurred because of fracture during machining or lack of wear resistance. In Comparative Example 14, in particular, machining was performed without using a focused ion beam. Fracture during machining occurred frequently. It was thus impossible to produce a tool having R1, R2, and R3 that were all sharp. A tool in which only R1 was sharp was successfully produced. However, fracture of the tool occurred at an early stage, compared with a tool produced with the focused ion beam. Furthermore, fracture of cutting edge lines between the rake face and the flank faces occurred frequently because of damage by polishing. A groove having large surface roughness was formed from the early stage of machining. In contrast, in the case of the cutting tool of the present invention for ultra-precision machining, a groove with a radius of curvature of 100 nm or less throughout its length was formed without fracture.

TABLE III

| | | Edge material | FIB machining | Tool shape | | | | | | Results of machining | | |
|---|---|---|---|---|---|---|---|---|---|---|---|---|
| | | | | Average grain size nm | Maximum grain size nm | R1 nm | R2 nm | R3 nm | L μm | Presence or absence of fracture | Wear resistance | Machined shape |
| Example | 5 | cBN | FIB machining 1*[1] FIB machining 2*[2] | 35 | 70 | 42 | 49 | 49 | 1 | absent | high | groove with a radius of curvature of 100 nm or less throughout its length |
| | 6 | cBN + wBN | ↑ | 10 | 40 | 40 | 48 | 48 | 1 | absent | high | groove with a radius of curvature of 100 nm or less throughout its length |
| | 7 | cBN | ↑ | 50 | 90 | 46 | 50 | 52 | 1 | absent | high | groove with a radius of curvature of 100 nm or less throughout its length |
| Comparative Example | 8 | single-crystal diamond | ↑ | — | — | 45 | 50 | 53 | 1 | present at 80-mm point | low | bad |
| | 9 | cBN | ↑ | 1100 | 2900 | 50 | 49 | 49 | 1 | present at 110-mm point | low | bad |
| | 10 | cBN | ↑ | 75 | 210 | 52 | 50 | 51 | 1 | present at 100-mm point | low | bad |
| | 11 | cBN | only FIB machining 1 | 60 | 110 | 49 | 180 | 53 | 1 | absent | middle | groove with a radius of curvature of 100 nm or more from 120-mm point |
| | 12 | cBN | only FIB machining 2 | 62 | 120 | 50 | 48 | 230 | 1 | absent | middle | groove with a radius of curvature of 100 nm or more from 90-mm point |
| | 13 | cBN | FIB machining 1 FIB machining 2 | 60 | 100 | 44 | 53 | 95 | 5 | absent | middle | groove with a radius of curvature of 100 nm or more from 100-mm point |
| | 14 | cBN | without FIB machining | 60 | 100 | 44 | 136 | 142 | absent | present at 10-mm point | low | bad |

*[1] machining to form flank face B with a focused ion beam directed from the rake face side to the flank side.
*[2] machining to form flank face A with a focused ion beam directed from the flank side to the rake face side.

Example 8

Hexagonal boron nitride having a grain size of 0.1 to 10 μm and a purity of 99.9% or more was charged into a Mo capsule and treated with a belt-type ultrahigh-pressure-generating apparatus at 12 GPa and 1650° C. for 30 minutes to form high-pressure-phase boron nitride. The grain size of the sample was observed with the electron microscope. The average grain size was 30 nm. The maximum grain size was 90 nm.

Rough machining was performed by laser cutting and polishing to form a tip-shaped piece. The tip-shaped piece was brazed to a shank. Then a rake face (Y) and a second flank face (2X) of a grooving tool were formed by rough polishing, as illustrated in FIG. 9.

Next, as illustrated in FIG. 5, the tool was mounted on a stage in such a manner that a beam was directed from the rake face (Y) side to the flank face (X) side and transferred into a focused ion beam apparatus. A flank face B (1XB) was formed on each of the side faces L and R of the grooving tool at an ion current of 1000 pA or less. Then, a flank face B (1XB) was formed on the front end face T of the grooving tool. Table IV describes the radius of curvature R3R of a ridge between two flank faces, i.e., the side face R and the front end face T, and the radius of curvature R3L of a ridge between two flank faces, i.e., the side face L and the front end face T.

Next, the tool was taken out, mounted on the stage in such a manner that a beam was directed from the flank side (1XB) to the rake face (Y) side as illustrated in FIG. 6, and transferred into the focused ion beam apparatus. A flank face A (1XA) was formed on each of the side faces L and R of the grooving tool at an ion current of 500 pA or less. Finally, a flank face A (1XA) was formed on the front end face T of the grooving tool, thereby completing the grooving tool. Table IV describes the radius of curvature R1R of the cutting edge defined by the side face R and the front end face T, the radius of curvature R1L defined by the side face L and the front end face T, the radii of curvature R2R, R2L, and R2T of ridges between the rake face and the flank faces, i.e., the side face R, the side face L, and the front end face T, and the distances LR, LL, and LT from ends of the flank face A to the rake face.

Next, the tool was mounted on an ultra-precision nano-processing machine. A workpiece composed of stainless steel (SUS 304) was subjected to grooving at a feed speed of 2 m/min, a depth of cut of 5 μm, and a cut length of 300 mm. In the cutting tool of the present invention for ultra-precision machining, a groove with a radius of curvature of 100 nm or less throughout its length was formed without fracture.

TABLE IV

| | | | Tool shape | | | | | | | |
|---|---|---|---|---|---|---|---|---|---|---|
| | Edge material | FIB machining | Average grain size nm | Maximum grain size nm | R1R nm | R1L nm | R2R nm | R2L nm | R2T nm | R3R nm |
| Example 8 | cBN | FIB machining 1 FIB machining 2 | 35 | 80 | 52 | 49 | 50 | 48 | 51 | 49 |

| | Tool shape | | | | Results of machining | | |
|---|---|---|---|---|---|---|---|
| | R3L nm | LR μm | LL μm | LT μm | Presence or absence of fracture | Wear resistance | Machined shape |
| Example 8 | 47 | 1 | 1 | 1 | absent | high | groove with a radius of curvature of 100 nm or less throughout its length |

Example 9

$BCl_3$ gas and acetonitrile were fed into a reaction tube in a molar ratio of 1:1 to deposit a graphite-like $BC_2N$ film on carbon heated to 1800° C. by high-frequency induction heating. The resulting graphite-like $BC_2N$ film was pulverized into particles having a particle size of 0.1 to 10 μm. The particles were charged into a Mo capsule and treated with a belt-type ultrahigh-pressure-generating apparatus at 25 GPa and 2200° C. for 30 minutes to form diamond-like polycrystalline $BC_2N$. The grain size of the sample was observed with the electron microscope. Table V describes the average grain size and the maximum grain size.

Rough machining was performed by laser cutting and polishing to form a tip-shaped piece. The tip-shaped piece was brazed to a shank. Then a rake face and a flank face of a V-shaped tool were formed by rough polishing.

Next, as illustrated in FIG. 5, the tool was mounted on a stage in such a manner that a beam was directed from the rake face (Y) side to the flank face (X) side and transferred into a focused ion beam apparatus. A flank faces B (1XB) was formed on each side of the V-shaped tool at an ion current of 1000 pA or less. A ridge between the two flank faces was observed with the tool tilted. The radius of curvature R3 is described in Table V.

Next, the tool was taken out, mounted on the stage in such a manner that a beam was directed from the flank side (X) to the rake face (Y) side as illustrated in FIG. 6, and transferred into the focused ion beam apparatus. A flank face A (1XA) was formed on each side of the V-shaped tool at an ion current of 500 pA or less. Table V describes the radius of curvature R1 of the cutting edge, the radius of curvature R2 of a ridge between the rake face (Y) and the flank face (1XA), and a distance L from a boundary between the flank face A (1XA) and the rake face (Y) to a boundary between the flank face A (1XA) and the flank face B (1XB).

By the foregoing machining, the V-shaped tool having a nose angle of 90° as illustrated in FIG. 7 was completed. A sharp V-shaped tool having a nose angle of 40° or less as illustrated in FIG. 8 may be produced in the same way as above.

Next, the tool was mounted on an ultra-precision nano-processing machine. A workpiece mainly composed of WC—Co—Ni was subjected to grooving at a feed speed of 10 mm/min, a depth of cut of 300 μm, and a cut length of 1000 mm. The cutting results are summarized in Table V.

Example 10

A V-shaped tool was produced as in Example 9, except that nano-polycrystalline $BC_2N$ having a grain size smaller than that in Example 9 was used.

Example 11

A V-shaped tool was produced as in Example 9, except that conductive nano-polycrystalline $BC_2N$ doped with boron was used.

Comparative Examples 15 to 21

As comparative examples, an example in which single-crystal $BC_2N$ was used, examples in which polycrystalline $BC_2N$ having different grain sizes was used, and examples in which different machining methods were employed are described in Table V.

As described in Table V, in any of the comparative examples, the shape defect of the groove occurred because of fracture during machining or lack of wear resistance. In Comparative Example 21, in particular, machining was performed without using a focused ion beam. Fracture during machining occurred frequently. It was thus impossible to produce a tool having R1, R2, and R3 that were all sharp. A tool in which only R1 was sharp was successfully produced. However, fracture of the tool occurred at an early stage, compared with a tool produced with the focused ion beam. Furthermore, fracture of cutting edge lines between the rake face and the flank faces occurred frequently because of damage by polishing. A groove having large surface roughness was formed from the early stage of machining. In contrast, in the case of the cutting tool of the present invention for ultra-precision machining, a groove with a radius of curvature of 100 nm or less throughout its length was formed without fracture.

TABLE V

| | | Edge material | FIB machining | Tool shape | | | | | | Results of machining | | |
|---|---|---|---|---|---|---|---|---|---|---|---|---|
| | | | | Average grain size nm | Maximum grain size nm | R1 nm | R2 nm | R3 nm | L μm | Presence or absence of fracture | Wear resistance | Machined shape |
| Example | 9 | poly-crystalline BC$_2$N | FIB machining 1*[1] FIB machining 2*[2] | 38 | 78 | 42 | 51 | 53 | 1 | absent | high | groove with a radius of curvature of 100 nm or less throughout its length |
| | 10 | poly-crystalline BC$_2$N | ↑ | 12 | 36 | 41 | 48 | 50 | 1 | absent | high | groove with a radius of curvature of 100 nm or less throughout its length |
| | 11 | boron-doped poly-crystalline BC$_2$N | ↑ | 52 | 93 | 46 | 48 | 50 | 1 | absent | high | groove with a radius of curvature of 100 nm or less throughout its length |
| Comparative Example | 15 | single-crystal BC$_2$N | ↑ | — | — | 46 | 48 | 50 | 1 | present at 70-mm point | low | bad |
| | 16 | poly-crystalline BC$_2$N | ↑ | 1100 | 3000 | 52 | 52 | 38 | 1 | present at 290-mm point | low | bad |
| | 17 | poly-crystalline BC$_2$N | ↑ | 78 | 205 | 50 | 48 | 52 | 1 | present at 680-mm point | low | bad |
| | 18 | poly-crystalline BC$_2$N | only FIB machining 1 | 66 | 104 | 48 | 160 | 50 | 1 | absent | middle | groove with a radius of curvature of 100 nm or more from 420-mm point |
| | 19 | poly-crystalline BC$_2$N | only FIB machining 2 | 64 | 122 | 50 | 52 | 216 | 1 | absent | middle | groove with a radius of curvature of 100 nm or more from 300-mm point |
| | 20 | poly-crystalline BC$_2$N | FIB machining 1 FIB machining 2 | 64 | 102 | 50 | 48 | 96 | 5 | absent | middle | groove with a radius of curvature of 100 nm or more from 290-mm point |
| | 21 | poly-crystalline BC$_2$N | without FIB machining | 58 | 86 | 44 | 146 | 142 | absent | present at 70-mm point | low | bad |

*[1]machining to form flank face B with a focused ion beam directed from the rake face side to the flank side.
*[2]machining to form flank face A with a focused ion beam directed from the flank side to the rake face side.

INDUSTRIAL APPLICABILITY

A cutting tool of the present invention has excellent fracture resistance, wear resistance, and a sharp cutting edge free from damage, such as a microcrack or strain, due to polishing processing or the like. It is thus possible to perform more precise machining over a longer distance, compared with the related art. Furthermore, the cutting tool is suitably applicable to ultra-precision machining for hard materials, which have hitherto been difficult to machine.

REFERENCE SIGNS LIST

X flank face
Y rake face
1X first flank face
2X second flank face
1XA first flank face A
1XB first flank face B
F direction of focused ion beam
R radius of curvature
R1 radius of curvature of cutting edge
R2 radius of curvature of ridge between rake face and flank face
R3 radius of curvature of ridge between two flank faces
D$_{50}$ average grain size
Dmax maximum grain size
L width of first flank face A

The invention claimed is:

1. A cutting tool comprising:
    a cutting edge composed of a polycrystalline body including high-pressure-phase hard grains that contain one or more elements selected from the group consisting of boron, carbon, and nitrogen, the polycrystalline body being formed by subjecting a non-diamond carbon material and/or boron nitride, serving as a starting material, to direct conversion sintering under ultra-high pressure and high temperature without adding a sintering aid or a catalyst,
    wherein letting the radius of curvature of the nose of the cutting edge of the cutting tool be R1, the sintered grains constituting the polycrystalline body have an average grain size of 1.2×R1 or less and a maximum grain size of 2×R1 or less,
    the radius of curvature R1 of the nose of the cutting edge of the cutting tool is 50 nm or less, and
    the sintered grains constituting the polycrystalline body have an average grain size of 60 nm or less.

2. The cutting tool according to claim 1, wherein letting the radius of curvature of a ridge between a rake face and a flank face of the cutting tool be R2, the sintered grains constituting the polycrystalline body have an average grain size of 1.2×R2 or less and a maximum grain size of 2×R2 or less.

3. The cutting tool according to claim 1, wherein letting the radius of curvature of a ridge between two flank faces of the cutting tool be R3, the sintered grains constituting the polycrystalline body have an average grain size of 1.2×R3 or less and a maximum grain size of 2×R3 or less.

4. The cutting tool according to claim 1, wherein the sintered grains constituting the polycrystalline body have a maximum grain size of 100 nm or less.

5. The cutting tool according to claim 2, wherein the radius of curvature R2 of the ridge between the rake face and the flank face of the cutting tool is 50 nm or less, and the sintered grains constituting the polycrystalline body have an average grain size of 60 nm or less and a maximum grain size of 100 nm or less.

6. The cutting tool according to claim 3, wherein the radius of curvature R3 of the ridge between the two flank faces of the cutting tool is 50 nm or less, and the sintered grains constituting the polycrystalline body have an average grain size of 60 nm or less and a maximum grain size of 100 nm or less.

7. The cutting tool according to claim 1, wherein the cutting edge of the cutting tool is a face formed by a focused ion beam, and the flank face includes a flank face A and a flank face B, the flank face A being closer to the rake face, and the flank face B being adjacent to the flank face A and farther from the rake face.

8. The cutting tool according to claim 7, wherein a length from a boundary between the flank face A and the rake face to a boundary between the flank face A and the flank face B is 3 µm or less.

9. The cutting tool according to claim 7, wherein the cutting tool is obtained by machining the flank face B with a focused ion beam directed from the rake face side to the flank side and then machining the flank face A with a focused ion beam directed from the flank side to the rake face side.

10. The cutting tool according to claim 1, wherein the polycrystalline body has electrical conductivity.

11. The cutting tool according to claim 1, wherein letting the radius of curvature of the nose of the cutting tool be R1, letting the radius of curvature of a ridge between a rake face and a flank face be R2, and letting the radius of curvature of a ridge between two flank faces of the cutting tool be R3, the average grain size of the polycrystalline body satisfies $0.01 \times R1$ or more, $0.01 \times R2$ or more, and $0.01 \times R3$ or more.

12. The cutting tool according to claim 1, wherein the polycrystalline body is composed of polycrystalline diamond consisting substantially of diamond alone, the polycrystalline diamond being formed by subjecting a non-diamond carbon material, serving as a starting material, to direct conversion sintering into diamond under ultra-high pressure and high temperature without adding a sintering aid or a catalyst.

13. The cutting tool according to claim 1, wherein the polycrystalline body is composed of polycrystalline boron nitride consisting substantially of high-pressure-phase boron nitride alone, the polycrystalline boron nitride being formed by subjecting low-pressure-phase boron nitride, serving as a starting material, to direct conversion sintering into high-pressure-phase boron nitride under ultra-high pressure and high temperature without adding a sintering aid or a catalyst, and wherein the high-pressure-phase boron nitride is cubic boron nitride and/or wurtzite boron nitride.

14. The cutting tool according to claim 1, wherein the cutting tool is a V-shaped tool, a fly cutter, or a micro-grooving tool.

* * * * *